United States Patent Office 3,533,981
Patented Oct. 13, 1970

3,533,981
STABILIZATION OF POLYMERS OF VINYL FLUORIDE
Charles Richard Franks, North Madison, Alexander W. Kennedy, Chardon, and John R. Semancik, Richmond Heights, Ohio, assignors to Diamond Shamrock Corporation, Cleveland, Ohio, a corporation of Delaware
No Drawing. Filed Feb. 21, 1968, Ser. No. 707,287
Int. Cl. C08d 1/36; C08f 45/38
U.S. Cl. 260—31.8                               12 Claims

ABSTRACT OF THE DISCLOSURE

A resinous composition comprises a vinyl fluoride polymer system of vinyl fluoride polymer, a latent solvent with or without a pigment and a stabilizer system synergistic to an additive of a polymer of an aliphatic ester of an acrylic and/or methacrylic acid, said ester having alkyl groups of 1 to about 4 carbon atoms. A method of stabilizing a vinyl fluoride polymer composition containing vinyl fluoride polymer, a latent solvent with or without a pigment and a stabilizer system comprises admixing to the composition an additive of a polymer of an aliphatic ester of an acrylic and/or methacrylic acid, said ester having alkyl groups of 1 to about 4 carbon atoms.

BACKGROUND OF THE INVENTION

Field of the invention

The present invention relates to the stabilization of fluorine-containing vinyl resins, particularly vinyl fluoride resins. Specifically, the present invention is particularly applicable to the stabilization of pigmented vinyl fluoride polymer resin compositions and coated articles thereof.

Description of the prior art

Vinyl fluoride polymers, particularly in the form of films and coatings, display a combination of excellent properties, e.g., weatherability (resistance to degradation when exposed to outdoor conditions), pliability and strength (flexural, tensile and tear) well within desirable ranges. Due to the fact that vinyl fluoride polymer deteriorates upon heating prior to its reaching the high temperatures necessary to prepare a film or coating and the polymer is insoluble in commonly-used volatile solvents, such as acetone, petroleum ether, iso-octane, xylene, etc., it has been found necessary to disperse the vinyl fluoride resin in the form of discrete particles in a suitable liquid medium which has substantially no solvent reaction on the polymer at room temperature, but which is capable at elevated temperatures of coalescing the polymer particles. However, vinyl fluoride polymers still are subject to severe degradation and consequent discoloration upon exposure to the high temperatures necessary for fusion of the polymer. Lack of such stability is a serious obstacle to the commercial exploitation of this polymer.

While considerable activity has been undertaken in the field of polymer stabilization in an attempt to improve heat stability of vinyl-type resins and numerous additives have been suggested and tried as polymer additives for incorporation in vinyl resins to prevent or minimize such deterioration, it is desirable to achieve further improved heat stability for a vinyl fluoride polymer system, particularly a pigmented vinyl fluoride polymer system. In addition, the prior art stabilizers or stabilizer systems which are effective to inhibit the deterioration of a vinyl polymer not containing other additives have been found to be ineffective in a vinyl fluoride polymer system containing latent solvent and pigment. Using the wide variety of stabilizers and stabilizer systems, as suggested in the prior art, vinyl fluoride polymer coating systems containing latent solvent and pigment become discolored at the fusion temperatures generally employed to produce satisfactory coating to a substrate. To date, it has remained desirable to achieve a stabilizer or stabilizer system effective to prevent discoloration of both a vinyl fluoride polymer and a vinyl fluoride polymer system containing resin, latent solvent and pigment.

SUMMARY OF THE INVENTION

The foregoing disadvantages of the prior art of polymer stabilization are overcome by the fluorine-containing vinyl resins as stabilized by the synergistic stabilizer system and additive of the instant invention enabling increased thermal stability at elevated temperatures.

Accordingly, it is an object of this invention to provide a stabilized vinyl fluoride polymer having an increased resistance to color degradation or deterioration.

It is a further object of the present invention to provide a pigmented vinyl fluoride polymer system having increased resistance to color degradation or deterioration upon baking at elevated temperatures.

A still further object of the present invention is to provide a synergistic additive of an acrylic and/or methacrylic acid to a stabilizer system to achieve increased resistance to color degradation upon baking at elevated temperatures.

Other objects and advantages of the instant invention will be apparent from the following description and the appended claims.

DESCRIPTION OF THE PREFERRED EMBODIMENTS

The above-mentioned and related objects are achieved by incorporating in a vinyl fluoride polymer system of vinyl fluoride polymer with a latent solvent and a stabilizing system, a synergistic additive of a polymer or copolymer of an aliphatic ester of acrylic and/or methacrylic acids, said ester having alkyl groups of 1 to about 4 carbon atoms. The vinyl fluoride polymer system may also have incorporated therein a pigment. Stabilizing systems energistic to the additive include a mixture of an aliphatic polyol having at least 2 to about 8 hydroxyl groups for each 2 to about 15 carbon atoms and a dithiophosphinate compound having the general formula

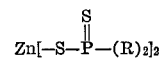

wherein R is a hydrocarbon radical (aliphatic, straight or branched, cyclic or aromatic, saturated or unsaturated, substituted or unsubstituted) containing 2 to about 18, preferably 3 to 12 carbon atoms, and (2) a mixture of an aliphatic polyol having at least 2 to about 8 hydroxyl groups for each 2 to about 15 carbon atoms, a dithiophosphinate compound having the following structure

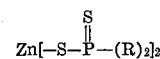

wherein R is a hydrocarbon radical (aliphatic, straight or branched, cyclic or aromatic, saturated or unsaturated, substituted or unsubstituted) containing 2 to 18, preferably 3 to 12 carbon atoms, and a diester of a thiodialkanoic acid having the general formula

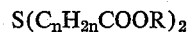

wherein $n$ is an integer from about 1 to 8 and R is a hydrocarbon radical (aliphatic, straight or branched, cyclic or aromatic, saturated or unsaturated, substituted or unsubstituted) from about 6 to 20 carbon atoms, wherein R may be the same or different radicals. In addition, it is within the scope of the instant invention that combinations of the two recited stabilizer systems may be employed along with the additive polymer or copolymer.

The terms "polymer" or "polymeric," as used herein and in the claims, especially for the acrylic polymer additive and the vinyl fluoride compositions, refer not only to homopolymers but also to copolymers. For example, a polymer of an aliphatic ester of an acrylic acid and a copolymer of an aliphatic ester of an acrylic and methacrylic acid are equally within the meaning of the term "polymer" as used herein.

Suitable polymers of acrylic and methacrylic esters include polymers of alkyl acrylates and alkyl methacrylates having alkyl groups of not over about 4 carbon atoms, such as methyl acrylate, ethyl acrylate, n-propyl acrylate, iso-propyl acrylate, n-butyl acrylate, sec-butyl acrylate, iso-butyl acrylate, tert-butyl acrylate and the corresponding methacrylates; i.e., methyl methacrylate, ethyl methacrylate, n-propyl methacrylate, isopropyl methacrylate, n-butyl methacrylate, sec-butyl methacrylate, iso-butyl methacrylate and tert-butyl methacrylate. Combination of any of the foregoing acrylates and methacrylates are within the teaching of this invention.

Exemplary of suitable diesters of thiodialkanoic acid include dilauryl thiodipropionate, dimyristyl thiodipropionate, dicetyl thiodipropionate, distearyl thiodipropionate, dicinnamyl thiodipropionate, dibenzylthiodipropionate, dicyclohexylthiodipropionate, dilauryl thiodibutyrate, etc., and mixtures thereof, e.g., 70% dilauryl thiodipropionate, 20% dimyristyl thiodipropionate and 10% dicetyl thiodipropionate. Preferably, the thiodialkanoic acid employed is dilauryl thiodipropionate.

Exemplary of suitable polyols include trimethylolethane, trimethylolpropane, pentaerythritol, dipentaerythritol, tripentaerythritol, sorbitol, mannitol, methylglucoside, sucrose, hydroxy propylsucrose (hyprose) and mixtures thereof; their partial esters with a carboxylic acid; polyhydroxy substituted acids such as gluconic, arabonic and glucoheptoic acid; their lactones; salts, e.g., sodium, potassium and ammonium; and esters, e.g., $C_4$–$C_{18}$ alkyl esters. These polyols are disclosed in U.S. Reissue Pat. 25,451, which is hereby incorporated by reference.

Suitable hydrocarbon radicals for use in the dithiophosphinates include the alkyl radicals ethyl, n-propyl, isopropyl, n-butyl, iso-butyl, amyl, hexyl, octyl, nonyl, lauryl, stearyl, etc.; the aryl radicals phenyl, substituted phenyl, etc.; the aralkyl radicals benzyl, ω-phenyl propyl, etc.; the alkaryl radicals tolyl, ethyl, phenyl, xylyl, etc.; the alkenyl radicals allyl, cinnamyl, butenyl, oleyl, etc.; the cycloalkyl radicals cyclohexyl, etc.; and the cycloalkenyl radicals cyclohexenyl, etc. If a substituted hydrocarbon radical is to be employed, the substitutent group should not interfere with the stabilizing effect of the stabilizer system. The hydrocarbon radical, R, may be the same or different. An especially preferred dithiophosphinate compound is zinc dicyclohexyl dithiophosphinate.

As noted above, the term "polymer," as used herein, refers not only to homopolymers but also to copolymers, especially for vinyl fluoride compositions. In addition to the homopolymers of vinyl fluoride, which are the preferred vinyl fluoride polymers, there may be employed copolymers of vinyl fluoride with other monoethylenically unsaturated monomers, copolymerizable therewith, wherein the vinyl fluoride is present in substantial or in major amounts, i.e., at least 75% to 80% of the total by weight. Examples are monoethylenic hydrocarbons, e.g., ethylene, propylene, isobutylene and styrene; halogen-substituted monoethylenic hydrocarbons, e.g., vinyl chloride, vinyl bromide, 1,1-dichloroethylene, 1,1-difluorochloroethylene, trifluorochloroethylene, tetrachloroethylene, trifluoropropylene, difluoroisobutylene; vinyl esters, e.g., vinyl formate, vinyl acetate, vinyl propionate, vinyl butyrate, vinyl benzoate, vinyl pivalate, vinyl stearate, vinyl salicylate and vinyl esters of inorganic acids; vinyl ethers, e.g., vinyl ethyl ether, tetrafluoroethyl allyl ether and vinyl dioxolane; vinyl ketones, e.g., methyl vinyl ketone; N-vinyl imides, e.g., N-vinyl succinimide and N-vinyl phthalimide; derivatives of maleic and fumaric acids, e.g., diethylmaleate and dimethylfumarate; propenyl esters, e.g., allyl acetate, isopropenyl acetate, etc. The presence of these copolymers, or even a small percentage of a comonomer, which, as a homopolymer, is normally more soluble in the selected latent solvent than is the homopolymer of vinyl fluoride, may render said copolymer sufficiently more soluble on a substrate containing considerably less solvent than is needed in the application of homopolymers of vinyl fluoride.

Suitable vinyl fluoride polymers have an intrinsic viscosity of at least about 0.35 and preferably at least about 0.75. The polymer particle may range in size up to about 30 microns in diameter, preferably the diameter of the polymer particles is below about 20 microns. The size of the polymer particle may be reduced by a variety of means known in the art, such as ball milling or grinding. Although particle sizes as low as 0.005 microns may be employed, it is preferable that the size of the particle be within the range of 0.05 to 10 microns. The particles in a given dispersion need not be uniform in size.

The intrinsic viscosity is determined by dissolving the polymer in N,N-dimethyl acetamide at 110° C. and measuring at this temperature the viscosity of the solution relative to that of the N,N-dimethyl acetamide obtained in the same manner. The time of efflux through a viscometer is measured for the solvent and for the solution of polymer in the solvent. The concentration of polymer in the solution is 0.1 g. per 100 ml. of solvent. The inherent viscosity is then calculated as follows:

$T_0$ = solvent flow time in seconds
$T_1$ = solution flow time in seconds
Relative viscosity = $T_1/T_0$ $$\text{Intrinsic viscosity} = \frac{\text{Natural logarithm of relative viscosity}}{C}$$

where C is the concentration as expressed grams of polymer per 100 ml. of solvent.

The latent solvents which may be used in the dispersion system of the present invention generally have boiling points of at least about 100° C., preferably boiling points above about 120° C. The latent solvent employed need not necessarily be liquid at room temperature provided its melting point is not so high that the temperature necessary for liquid blending of the latent solvent subjects the polymer to thermal degradation.

Following are examples of specific compounds representative of the class of latent solvents useful in the process of the present invention: gamma butyrolactone, butadiene cyclic sulfone, tetramethylenesulfone, dimethylsulfolane, hexamethylenesulfone, diallylsulfoxide, dimethylsulfoxide, dicyanobutene, adiponitrile, ethylene carbonate, propylene carbonate, 1,2-butylene carbonate, 2,3-butylene carbonate, isobutylene carbonate, trimethylene carbonate, N,N-diethylformamide, N,N-dimethylacetamide, N,N-dimethylformamide, N,N-dimethyl-gamma-hydroxyacetamide, N,N - dimethyl-gamma-hydroxybutyramide, N,N-diethylacetamide, N,N-dimethylmethoxyacetamide, N-methylacetamide, N-methylformamide, N,N-dimethylaniline, N,N-dimethylethanolamine, 2-piperidone, N-methyl-2-piperidone, N-methyl-2-pyrrolidone, N-ethyl-2-pyrrolidone, N-isopropyl-2-pyrrolidone, 5-methyl-2-pyrrolidone, beta-propiolactone, delta-valerolactone, gamma-valerolactone, alpha-angelicalactone, beta-angelicalactone, epsilon-caprolactone, and alpha, beta and gamma-substituted alkyl derivatives of gamma-butyrolactone, gamma-valerolactone and delta valerolactone, as well as delta-substituted alkyl derivatives of delta-valerolactone, tetramethyl urea, 1-nitropropane, 2-nitropropane, acetonyl acetone, acetophenone, acetyl acetone, cyclohexanone, diacetone alcohol, dibutyl ketone, isophorone, mesityl oxide, methylamyl ketone, 3-methylcyclohexanone, bis-(methoxymethyl)uron, methylacetylsalicylate, diethyl phosphate, dimethyl phthalate, ethyl acetoacetate, methyl benzoate, methylene diacetate, methyl salicylate, phenyl acetate, triethyl phosphate, tris-(morpholino)-phosphine oxide, N-acetylmorpholine, N-acetylpiperidine, isoquinoline, quinoline, pyridine and tris-(dimethylamido)phosphate.

Of the many pigments employed white pigments have been the most widely used in coating exterior surfaces. Titanium dioxide has been the most commonly employed white inorganic pigmentary substance probably because of a combination of innate properties it possesses, i.e., high refractive index, lack of color (whiteness), physical and chemical stability and relatively low specific gravity. Titanium dioxide pigments are classified as either "chalking" or "non-chalking." Chalking-type pigment is characterized by a gradual film deterioration to a powdery chalk which is removed by the eroding action of wind and rain to expose the underlying section to further attack resulting in a progressive wearing away of the coating system. Anatase crystal modification of titanium dioxide exhibits this chalking characteristic. For most commercial coating applications, however, chalking-type pigments are not employed for the above reason.

The rutile crystal modification of titanium dioxide, especially rutile crystals treated with oxides of silicon, aluminum or zinc, exhibits non-chalking characteristics. Like the chalking, crystal-type modification, anatase, color development also occurs with rutile during the baking operation. Unlike dispersion coating systems containing the chalking-type pigment, dispersion coating systems containing the non-chalking type pigment are difficult to stabilize and are not necessarily stabilized with compounds found suitable to stabilize a system containing the chalking-type pigment. However, using the stabilization system of the present invention whatever form of crystal modification of titanium dioxide is employed the resultant pigmented vinyl fluoride polymer coating is resistant to discoloration on baking and subsequent aging.

In addition to the reactive pigment the dispersion system may contain other highly divided solid pigments, pigment extenders, fillers or the like and other conventionally used compounding pigmented system such as lithopone, zinc sulfide, iron oxide, mica, china clay, mineral silicate and coloriferous agents. Also, protective colloids and pigment dispersing or deflocculating agents, such as tetrasodium pyrophosphate or potassium tripolyphosphate may be employed.

The proportions of vinyl fluoride polymer, latent solvent, pigment and stabilizer system with additive may vary depending on the type of application and the method of application desired. The amount of latent solvent is adjusted to give a fluid or sometimes viscous composition that is of suitable consistency for application to the particular substrate which is to be coated. This, of course, will vary greatly according to the manner of application; for instance, whether it is desired to spray the dispersion on the substrate, to dip the substrate into the dispersion or to apply the dispersion on the substrate with some sort of roller system as well as other factors such as temperature, type of liquid dispersants employed and the like.

Generally, however, from about 25 to 500 parts, preferably about 100 to 300 parts, by weight, of latent solvent per 100 parts of vinyl fluoride polymer have been found suitable in the resinous composition. The stabilizer system may be incorporated into the resin composition in stabilizing concentrations from about 0.05 to 10 parts, preferably about 0.1 to about 5 parts, by weight, based on 100 parts, by weight, of vinyl fluoride polymer, when the stabilizer system is a dithiophosphinate compound and a polyol. The ratio of the dithiophosphinate compound to polyol is within the range of about 0.25 to 4:1, preferably 0.5 to 1.5:1, with an especially preferred ratio being 1:1. When a diester of a thiodialkanoic acid is combined with a dithiophosphinate compound and a polyol as a stabilizer system, the amount of each of the components in the stabilizer system may be within the range of from about 17% to 66% by weight of the total weight of the stabilizer system with the total of the stabilizing system varying between 0.05 to 10 parts, preferably 0.1 to about 5 parts, by weight, based on 100 parts, by weight, of vinyl fluoride polymer; preferably each of the components is present in the stabilizer system in equal proportions. The polymer or copolymer of an aliphatic ester of acrylic and/or methacrylic acid may be incorporated in the resin system in stabilizing concentrations from about 0.25 to 150 parts, preferably about 1.0 to about 50 parts, by weight, based on 100 parts, by weight of vinyl fluoride polymer. The pigment is present in the dispersion system within the range of about 1 to 100 parts, by weight, preferably 10 to 60 parts, by weight, per 100 parts, by weight, of vinyl fluoride polymer present.

It is to be noted that the above ranges of acrylic-type polymer are employed for stabilization properties; additional higher concentrations of acrylic-type polymer may be employed to enhance viscosity characteristics, or to alter the physical properties of the resulting coatings.

The polyvinyl fluoride dispersion system may be prepared by blending the vinyl fluoride polymer, latent solvent, pigment and stabilization system in a wide variety of mixing equipment, including Hobart mixers, Waring Blendors, ball mills, colloid mills, sand grinding equipment and the like. Advantageously, a pigment slurry containing the pigment, stabilization system and part of the latent solvent is first prepared in order to grind and disperse thoroughly the pigment before introducing the vinyl fluoride polymer. It is not necessary that the acrylic polymer additive of the stabilization system be included in the pigment slurry as it may be added in a separate step, if desired. Also, in order to facilitate further dispersing of the vinyl fluoride polymer, a solvent solution containing the remaining portion of latent solvent to be employed and other additives such as thickening agents and like ingredients may be prepared beforehand to ensure solution. Once the pigment slurry and latent solution has been prepared, the vinyl fluoride polymer then may be incrementally added to the pigment slurry-latent solvent solution mixture in a high speed agitator followed by a ball milling of the resistant dispersion, if desired.

A great variety of substrates may be coated in accordance with this invention; for example, leather, cloth, resins, wood, stone, concrete, cement and, of special interest are coatings for metals including steel, aluminum, copper, iron, magnesium and nickel and any alloy thereof.

After the vinyl fluoride polymer dispersion system of the present invention has been applied as a coating to the substrate, adhesion is achieved by employing heat to cure the dispersion system without discoloration or decomposition of the coating during baking. The heat curing of the pigmented vinyl fluoride polymer dispersion system may proceed by the method disclosed in U.S. Pat. No. 3,317,336, hereby incorporated by reference. The method disclosed therein comprises heat curing the applied vinyl fluoride polymer under controlled conditions involving an initial heat step sufficient to coalesce the pigmented polyvinyl fluoride on the substrate followed by a post-cure heating conducted at a temperature of at least about 50° F. above the initial heat curing treatment. Alternatively, the applied pigmented polyvinyl fluoride dispersion coating may be heat cured in a single heat treating step comprising heating the applied pigmented polyvinyl fluoride dispersion coating at an elevated temperature, generally in excess of about 450° F., for a sufficient period of time to effect adhesion of the coating to the substrate.

In order that those skilled in the art may more completely understand the present invention and the preferred method by which the same may be carried into effect the following specific examples are offered.

EXAMPLE 1

A series of white pigmented polyvinyl fluoride dispersions systems containing titanium dioxide from various commercial sources and employing various stabilizers are prepared having the following recipe:

| Component: | Parts by weight |
|---|---|
| Polyvinyl fluoride | 100.00 |
| Dimethylphthalate | (1) |
| Titanium dioxide pigment | 30.00 |
| Stabilizer (including acrylic polymer) | 0–5.9 |

¹ Solvent sufficient to make solids of 28–32%.

The acrylic polymer additive is used in the range of 0 to 5.0 parts per 100 parts polyvinyl fluoride. The polyvinyl fluoride employed has an intrinsic viscosity of 0.9. The pigmented polyvinyl fluoride dispersion is prepared by first making a pigmented slurry with solvent solution and then incrementally mixing into this mixture the polyvinyl fluoride. The ingredients are ground in a ball mill for 24 hours after which the pigmented dispersion is deaerated to remove all contained air.

The prepared pigmented polyvinyl fluoride dispersions are applied to anodized aluminum panels (6″ x 12″ chromate-treated aluminum panels supplied by Q-Panel Company, Cleveland, Ohio) by means of a Baker film applicator to give a dry film thickness of about 1 mil. The wet films are heated for various times in a hot air circulating oven at 450° C. Observations are then made concerning color retention and adhesion of the finished pigmented coating. The particular stabilizers employed and data obtained from the color retention test and adhesion test for each of the coatings are reported in Table I below. For convenience, stabilizer components tested are coded as follows:

STABILIZER COMPONENTS

| Trade name | Compound | Code |
|---|---|---|
| Acryloid A-21 | Acrylic ester polymer | A |
| | Tripentaerythritol | B |
| X-732 | Zinc dicyclohexyl dithiophosphinate | C | rated, substituted or unsubstituted) containing 2 to about 18, preferably 3 to 12, carbon atoms (here zinc dicyclohexyl dithiophosphate).

EXAMPLE 2

Example 1 is repeated employing different combinations for the components of the stabilizing system except that Run 1 of Table I is used as Run 5 of Table II. For convenience the stabilizer systems tested are identified and coded as follows:

STABILIZER COMPONENTS

| Trade name | Compound | Code |
|---|---|---|
| Acryloid A-21 | Acrylic ester polymer | A |
| | Tripentaerythritol | B |

The data obtained from the color retention test and adhesion test for each of the stabilizer systems are reported in Table II, below.

TABLE II

| Run No. | Code | Stabilizer in parts per hundred parts PVF | Time (minutes) | | | | | |
|---|---|---|---|---|---|---|---|---|
| | | | 2 | | 4 | | 6 | |
| | | | Color | AD | Color | AD | Color | AD |
| 5 | | | W | P | CC | | | |
| 6 | B | 0.5 | W | P | W | P | CC | |
| 7 | B | 0.5 | W | P | W | P | CC | |
| | A | 5.0 | | | | | | |

CODE:
Color: W=White; CC=Color Change.
Adhesion (AD): P=Passed.

Table II demonstrates that the science of stabilization by the acrylic medium is empirical as it does not operate with all stabilizers. Reference is made to Run 7.

TABLE I

| | Code | Stabilizer in parts per hundred parts PVF | Time (minutes) | | | | | | | | | | | |
|---|---|---|---|---|---|---|---|---|---|---|---|---|---|---|
| | | | 2 | | 4 | | 6 | | 12 | | 14 | | 20 | 24 |
| | | | Color | AD | Color | AD | Color | AD | Color | AD | Color | AD | Color | Color |
| Run No.: | | | | | | | | | | | | | | |
| 1 | | | W | P | CC | | | | | | | | | |
| 2 | A | 5 | W | P | SCC | P | CC | | | | | | | |
| 3 | B | 0.3 | W | P | W | P | W | P | W | P | CC | | | |
| | C | 0.3 | | | | | | | | | | | | |
| 4 | B | 0.3 | W | P | W | P | W | P | W | P | W | P | SS | CC |
| | C | 0.3 | | | | | | | | | | | | |
| | A | 5.0 | | | | | | | | | | | | |

CODE:
Color: W=White; SCC=Slight Color Change; CC=Color Change; SS=Slightly Spotted.
Adhesion (AD): P=Passed.

Table I demonstrates that employing an acrylic additive which is synergistic to the other components (B and C) exhibiting stabilization qualities remarkably improves the thermal stability of the polyvinyl fluoride dispersion system; viz, see Run 4. The stabilizing components employed are a mixture of an aliphatic polyol having at least 2 to about 8 hydroxyl groups for each 2 to about 15 carbon atoms (here tripentaerythritol) and a dithiophosphinate compound having the general formula

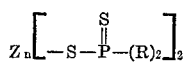

wherein R is a hydrocarbon radical (aliphatic, straight or branched, cyclic or aromatic, saturated or unsatu-

EXAMPLE 3

Example 1 is repeated employing different combinations for the components of the stabilizing system except that Run 1 of Table I is used as Run 8 of Table III. For convenience, the stabilizer systems tested are identified and coded as follows:

STABILIZER COMPONENTS

| Trade name | Compound | Code |
|---|---|---|
| Acryloid A-21 | Acrylic ester polymer | A |
| | Tripentaerythritol | B |
| X-732 | Zinc dicyclohexyldithiaphosphinate | C |
| LTDP | Dilaurylthiodipropionate | D |

TABLE III

| Run No. | Code | Stabilizer in parts per hundred parts PVF | Time (minutes) | | | | | | | | | | | |
|---|---|---|---|---|---|---|---|---|---|---|---|---|---|---|
| | | | 2 | | 4 | | 10 | | 12 | | 27 | | 30 | |
| | | | Color | AD | Color | AD | Color | AD | Color | AD | Color | AD | Color | AD |
| 8 | | | W | P | CC | | | | | | | | | |
| 9 | A | 5 | W | P | SCC | P | CC | | | | | | | |
| 10 | {B, C, D} | {0.3, 0.3, 0.3} | W | P | W | P | SS | P | S | | | | | |
| 11 | {A, B, C, D} | {5.0, 0.3, 0.3, 0.3} | W | P | W | P | W | P | W | P | W | P | CC | P |

CODE:
Color: W=White; SCC=Slight Color Change; CC=Color Change; SS=Slightly Spotted; S=Spotted.
Adhesion (AD): P=Passed.

The addition of the acrylic component achieves a synergistic effect for the formulation which is greater than additive time periods for the separate formulations, i.e., Run 13 is more stable than the summation of Run 11 and Run 12.

EXAMPLE 4

Example 1 is repeated employing different combinations for the components of the stabilizing system and a different temperature (500° F.), for the hot air circulating oven used in testing the color retention and adhesion of the finished pigmented coatings. The stabilizer systems tested are identified and coded as set forth in Example 3. Table IV sets forth the results for color retention.

TABLE IV

| Run No. | Code | Stabilizer in parts per hundred parts PVF | Time (minutes) | | | | | | |
|---|---|---|---|---|---|---|---|---|---|
| | | | 1, color | 1½, color | 2, color | 2½, color | 9, color | 10, color | 14, color | 15, color |
| 12 | | | W | CC | | | | | | |
| 13 | A | 5.0 | W | W | W | CC | | | | |
| 14 | {B, C, D} | {0.3, 0.3, 0.3} | W | W | W | W | W | SS | | |
| 15 | {A, B, C, D} | {5.0, 0.3, 0.3, 0.3} | W | W | W | W | W | W | W | CC |

CODE:
Color: W=White; CC=Color Change; SS=Slightly Spotted.

It is to be understood that although the invention has been described with specific reference to particular embodiments thereof, it is not to be so limited, since changes and alterations therein may be made which are within the full intended scope of this invention as defined by the appended claims.

We claim:
1. A vinyl fluoride resinous composition comprising
   (a) 100 parts by weight of a vinyl fluoride polymer containing at least 75% by weight of the total weight of the polymer of vinyl fluoride,
   (b) from 25 to 500 parts by weight of a latent solvent,
   (c) from 5 to 30 parts by weight of a pigment, and
   (d) a mixture of
      (i) from 0.05 to 10 parts by weight of a stabilizing system selected from the group consisting of (1) a mixture of an aliphatic polyol having at least 2 to about 8 hydroxyl groups for each 2 to about 15 carbon atoms and a dithiophosphinate compound having the structure

$$Zn[-S-\overset{S}{\underset{\|}{P}}-(R)_2]_2$$

where R is a hydrocarbon radical containing 2 to 18 carbon atoms and (2) a mixture of an aliphatic polyol having at least 2 to about 8 hydroxyl groups for each 2 to about 15 carbon atoms, a dithiophosphinate compound having the structure $$Zn[-S-\overset{S}{\underset{\|}{P}}-(R)_2]_2$$

where R is a hydrocarbon radical containing 2 to 18 carbon atoms and a diester of a thiodialkanoic acid having the general formula $$S(C_nH_{2n}COOR)_2$$

where $n$ is an integer from about 1 to 8 and R is a hydrocarbon radical from about 6 to 20 carbon atoms and synergistic to
   (ii) from 0.25 to 150 parts by weight of an additive of a polymer selected from the group consisting of an aliphatic ester of acrylic acid, an aliphatic ester of methacrylic acid and combinations thereof, said esters having alkyl groups of 1 to 4 carbon atoms.

2. The composition according to claim 1 wherein the stabilizer system is a mixture of an aliphatic polyol having at least 2 to about 8 hydroxyl groups for each 2 to about 15 carbon atoms and a dithiophosphinate compound having the structure $$Zn[-S-\overset{S}{\underset{\|}{P}}-(R)_2]_2$$

where R is a hydrocarbon radical containing 2 to 18 carbon atoms.

3. The composition according to claim 1 wherein the stabilizer system is a mixture of an aliphatic polyol having at least 2 to about 8 hydroxyl groups for each 2 to about 15 carbon atoms, a dithiophosphinate compound having the structure $$Zn[-S-\overset{S}{\underset{\|}{P}}-(R)_2]_2$$

where R is a hydrocarbon radical containing 2 to 18 carbon atoms and a diester of a thiodialkanoic acid having the general formula $$S(C_nH_{2n}COOR)_2$$

where $n$ is an integer from about 1 to 8 and R is a hydrocarbon radical from about 6 to 20 carbon atoms.

4. The composition according to claim 1 wherein the additive is methylmethacrylate polymer.

5. The composition of claim 1 wherein the vinyl fluoride resinous composition has incorporated a latent solvent without a pigment additive.

6. The composition according to claim 1 wherein the pigment is primarily titanium dioxide.

7. The composition according to claim 1 wherein the latent solvent is dimethylphthalate.

8. The vinyl fluoride resinous composition of claim 1 comprising 100 parts, by weight, of vinyl fluoride polymer containing at least 75% by weight of the total weight of the polymer of vinyl fluoride, 25 to 500 parts, by weight, latent solvent therefor, 5 to 30 parts titanium dioxide pigment based on the weight of the polymer and 0.05 to 10 parts, by weight of a stabilizer system, based on the weight of the polymer and 0.25 to 150 parts of an acrylic additive, based on the weight of polymer.

9. A method of stabilizing a vinyl fluoride polymer dispersion coating composition comprising:
  (a) 100 parts by weight of a vinyl fluoride polymer containing at least 75% by weight of the total weight of the polymer of vinyl fluoride,
  (b) from 25 to 500 parts by weight of a latent solvent,
  (c) from 5 to 30 parts by weight of a pigment, and
  (d) a mixture of
    (i) from 0.05 to 10 parts by weight of a stabilizing system selected from the group consisting of (1) a mixture of an aliphatic polyol having at least 2 to about 8 hydroxyl groups for each 2 to about 15 carbon atoms and a dithiophosphinate compound having the structure

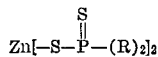

where R is a hydrocarbon radical containing 2 to 18 carbon atoms and (2) a mixture of an aliphatic polyol having at least 2 to about 8 hydroxyl groups for each 2 to about 15 carbon atoms, a dithiophosphinate compound having the structure

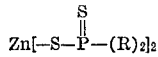

where R is a hydrocarbon radical containing 2 to 18 carbon atoms and a diester of a thiodialkanoic acid having the general formula

where $n$ is an integer from about 1 to 8 and R is a hydrocarbon radical from about 6 to 20 carbon atoms and synergistic to (ii) from 0.25 to 150 parts by weight of an additive of a polymer selected from the group consisting of an aliphatic ester of acrylic acid, an aliphatic ester of methacrylic acid and combinations thereof, said esters having alkyl groups of 1 to 4 carbon atoms which comprises admixing a mixture of (a), (b), (c) and (d)(i) with (d)(ii).

10. The method according to claim 9 wherein the additive is methylmethacrylate polymer.

11. The method of claim 9 wherein the stabilizing system is a mixture of an aliphatic polyol having at least 2 to about 8 hydroxyl groups for each 2 to about 15 carbon atoms and a dithiophosphinate compound having the structure

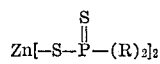

wherein R is a hydrocarbon radical containing 2 to 18 carbon atoms.

12. The method of claim 9 wherein the stabilizing system is a mixture of an aliphatic polyol having at least 2 to about 8 hydroxyl groups for each 2 to about 15 carbon atoms, a dithiophosphinate compound having the structure

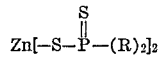

where R is a hydrocarbon radical containing 2 to 18 carbon atoms and a diester of a thiodialkanoic acid having the general formula

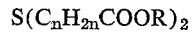

where $n$ is an integer from about 1 to 8 and R is a hydrocarbon radical from about 6 to 20 carbon atoms.

References Cited

UNITED STATES PATENTS 3,324,069    6/1967    Koblitz et al. _____ 260—900 X
3,429,844    2/1969    Neros et al.

MORRIS LIEBMAN, Primary Examiner

L. T. JACOBS, Assistant Examiner

U.S. Cl. X.R.

260—41, 45.75, 45.95